(12) United States Patent
McDonald et al.

(10) Patent No.: US 6,414,718 B1
(45) Date of Patent: Jul. 2, 2002

(54) DE-INTERLACING A VIDEO SIGNAL REPRESENTING INTERLACED FIELDS

(75) Inventors: Stuart McDonald, Hedge End; Robert Beattie, Edinburgh, both of (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/444,464

(22) Filed: Nov. 22, 1999

(30) Foreign Application Priority Data

Nov. 30, 1998 (GB) ............................................. 9826170

(51) Int. Cl.$^7$ ................................................. H04N 7/01

(52) U.S. Cl. ....................................... 348/448; 348/446

(58) Field of Search ................................ 348/446, 448, 348/441; H04N 7/01

(56) References Cited

U.S. PATENT DOCUMENTS 5,822,008 A * 10/1998 Inoue .......................... 348/446

* cited by examiner

*Primary Examiner*—Sherrie Hsia
(74) *Attorney, Agent, or Firm*—Douglas S. Rupert; Wildman, Harrold, Allen & Dixon

(57) ABSTRACT

The present invention relates to converting a video signal comprising input image samples conforming to an interlace scanning lattice into a video signal comprising output image samples conforming to a progressive scanning lattice. First and second temporal filters receive and divide the input image samples into first and second temporal sub-bands. First and second low-pass vertical filters vertically filter each temporal sub-band such that the higher temporal sub-band is vertically filtered to a greater degree than the lower temporal sub-band. The filtered image samples from each sub-band are combined to form a filter output signal and a re-sampler re-samples the filter output signal to form the output image samples.

14 Claims, 7 Drawing Sheets

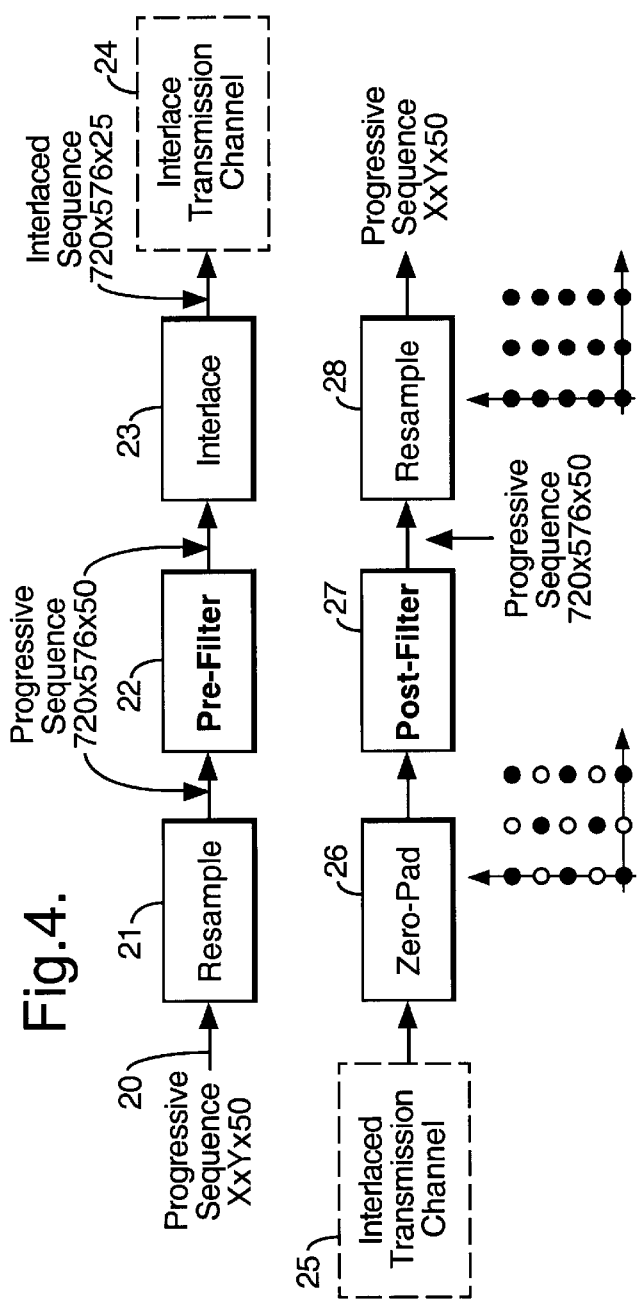
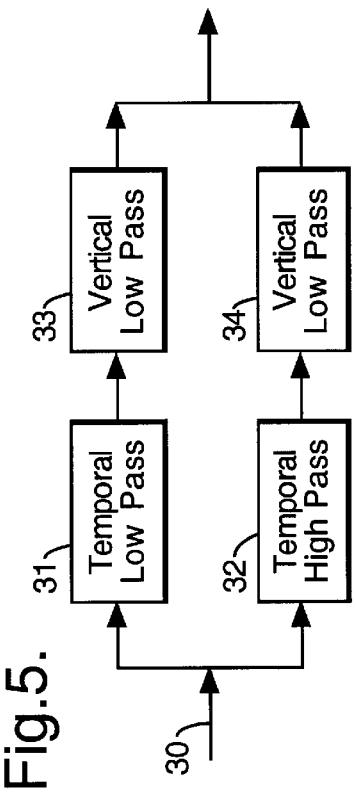

Fig. 11.
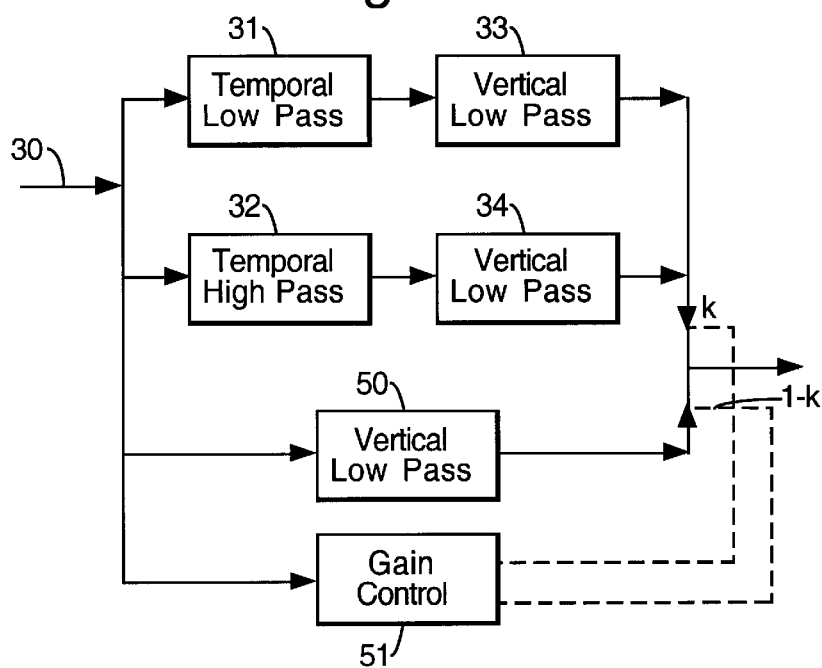
Fig. 11A.
| | | | | | | | | | |
|---|---|---|---|---|---|---|---|---|---|
| $a_n$(low pass) | 0.013 | -0.011 | -0.164 | 0.510 | 1.303 | 0.510 | -0.164 | -0.011 | 0.013 |
| $a_n$(high pass) | 0.057 | 0.153 | 0.255 | 0.347 | 0.376 | 0.347 | 0.255 | 0.153 | 0.057 |
| $a_n$(all pass) | 0.000 | -0.050 | 0.000 | 0.550 | 1.000 | 0.550 | 0.000 | -0.050 | 0.000 |
Fig. 12.
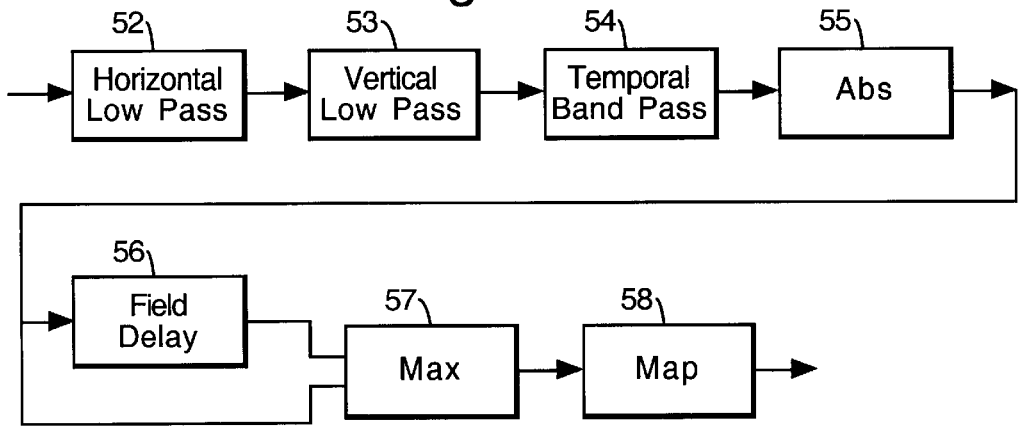

DE-INTERLACING A VIDEO SIGNAL REPRESENTING INTERLACED FIELDS

BACKGROUND OF THE INVENTION

1). Field of the Invention

The present invention relates to converting a video signal comprising input image samples conforming to an interlace scanning lattice into a video signal comprising output image samples conforming to a progressive scanning lattice.

2) Description of the Related Art

Image transmission systems require an initial generation of a multidimensional signal which is a function of three independent variables (x,y,t) in space and time. The initial signal is sampled and formatted so as to form a one-dimensional signal suitable for transmission. The sampling operation can be described by a sampling lattice which expresses the sample locations as a linear combination of sample indices which are the horizontal, temporal and vertical indices respectively. The two most common lattices used in transmitting video signals are the progressive scanning lattice and the interlace scanning lattice.

Considerable attention has been paid to providing higher quality pictures for television picture transmissions and the possibility for conversion between different sampling lattices. Such conversion requires attention to the conversion of video signals which employ an interlace scanning lattice into video signals which conform to a progressive scanning lattice.

A problem with such conversion arises because of the generation of unwanted image artefacts.

SUMMARY OF THE INVENTION

It is an aim of the present invention to provide improved filtering in the conversion of a video signal from an interlace scanning lattice to a progressive scanning lattice.

According to the present invention there is now provided a method of converting a video signal comprising input image samples conforming to an interlace scanning lattice into a video signal comprising output image samples conforming to a progressive scanning lattice, the method comprising the steps of: applying the input image samples to first and second temporal filters to divide the input image samples into first and second temporal sub-bands; vertically filtering each temporal sub-band by means of a low-pass vertical filter; the higher temporal sub-band being vertically filtered to a greater degree than the lower temporal sub-band; and, recombining the filtered image samples from each sub-band to form a filter output signal.

Further according to the present invention, there is provided apparatus for converting a video signal comprising input image samples conforming to an interlace scanning lattice into a video signal comprising output image samples conforming to a progressive scanning lattice, the apparatus comprising: first and second temporal filters to receive and divide the input image samples into first and second temporal sub-bands; first and second low-pass vertical filters to vertically filter each temporal sub-band such that the higher temporal sub-band is vertically filtered to a greater degree than the lower temporal sub-band; and, recombining means to recombine the filtered image samples from each sub-band to form a filter output signal.

BRIEF DESCRIPTION OF THE DRAWINGS

The invention will now be described, by way of example, with reference to the accompanying drawings in which:

FIG. 4 shows a video signal transmission system embodying the present invention;

FIG. 5 shows a filter configuration used in the transmission system of FIG. 4;

FIG. 11 shows an adaptive form of the filter configuration of FIG. 5;

FIG. 11A shows filter coefficients applicable to the filter configuration of FIG. 11;

FIGS. 12 and 13 show gain control circuits used in the adaptive filter configuration of FIG. 11;

DESCRIPTION OF THE PREFERRED EMBODIMENTS

Figure 1:
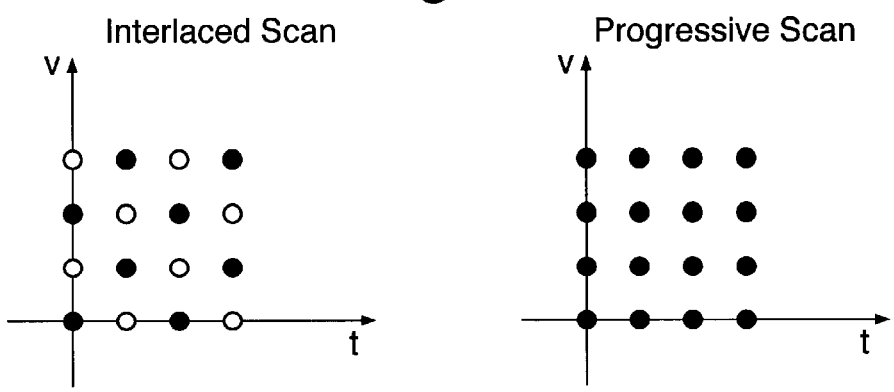
FIG. 1 shows interlaced and progressive scanning lattices.

In the upper part of FIG. 1 is shown a scanning lattice for an interlaced video signal and in the lower part of FIG. 1 is shown a scanning lattice for the corresponding progressively scanned video signal. As is well known, each field consists of a raster scan of lines of image samples of the video signal. In FIG. 1, each line is represented by one filled dot and a field is represented by a vertical column of filled dots along the y axis and successive fields are spaced along the time axis, t. For the interlaced video signal seen at the top of FIG. 1, alternate fields have image samples which are displaced in the vertical direction relative to the image samples of the adjoining fields, the spacing interval being represented by unfilled dots in FIG. 1.

Figure 2:
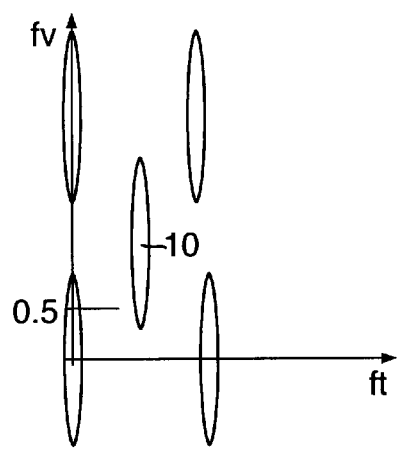
FIG. 2 shows spectra associated with the interlaced scanning lattice of FIG. 1.

The frequency spectra of the interlaced sequences for a stationary image are shown in FIG. 2. The spectrum of each sequence is confined approximately to a plane. In the conversion from an interlaced to a progressive scanning format it is desirable to remove from the video signal the spectral component 10 introduced by the conversion.

Figure 3:
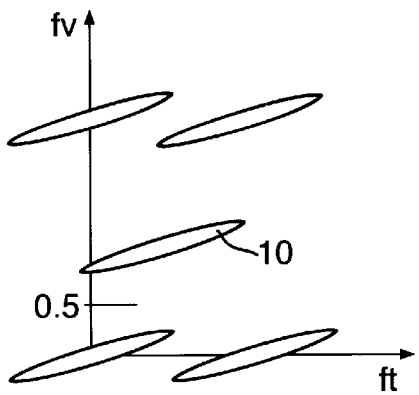
FIG. 3 shows the effect of motion on the spectra of FIG. 2.

The spectrum of a video signal representing a moving image differs from that of a stationary image and is a function of the motion in the scene being depicted. The effect of motion is seen in FIG. 3. The spectral components which need to be removed from the video signal in the conversion from an interlaced to a progressive scanning format will therefore be a function of the motion in the scene being depicted.

In FIG. 4, an image transmission system includes a camera and image sampler to form an input video signal 20 which is described by horizontal and vertical indices of values X and Y and a temporal index of 50. The values X and Y are intended to demonstrate that the system of FIG. 4 is not limited to any specific selection of horizontal or vertical index. Furthermore, the system of FIG. 4 is not limited to a temporal index of 50 but it is convenient to describe the operation of the system by reference to this specific number.

The signal 20 is comprised of a stream of image samples which conform to a progressive scanning lattice. A resampler 21 receives the input video signal 20 and subjects the signal 20 to a resampling operation to form a video signal in which the horizontal index is 720 and the vertical index is 576. In other words, there are 50 fields per second in the video signal from the resampler 21, with 720 samples per line and 576 lines per field. The resampled signal from the resampler 21 is passed to a pre-filter 22 to filter the resampled signal before passing the resampled signal to an interlace module 23. The interlace module 23 converts the progressive sequence from the pre-filter to an interlaced sequence which has half the data rate. The interlaced sequence is transmitted through an interlace transmission channel having a transmitter end 24 and a receiver end 25. The transmission channel is configured to transmit signals which conform to the well-known MPEG standard.

The receiver 25 passes the transmitted video signal to a zero padding module 26 in which the received signal is padded with zeros. As indicated diagrammatically, each interval between adjacent lines of each field is padded with a zero so that in each field, alternate lattice positions have a zero value. The padded signal is applied to a post-filter 27 which filters the padded signal in a manner which will be explained. The filtering process changes the values of all the image samples so that the filtered signal includes image sample values in all the lattice positions of the same progressive sequence that was provided to the interlace module 23. The filtered signal is re-sampled by a resampler 28 to recover the original signal having the spatial indices of X and Y and a temporal index of 50.

FIG. 5 shows a filter configuration used for the post-filter 27. As will be explained later, this configuration can also be used for the pre-filter 22. The filter 27 receives the stream of image samples from the zero padding module 26 at an input terminal 30. The stream of image samples, including the padding zeros, is divided into a temporal low-pass band by means of a filter element 31 and a temporal high-pass band by means of a filter element 32. The temporal low-pass band is filtered by means of a vertical low-pass filter element 33 and the temporal high-pass band is filtered by a vertical low-pass filter element 34. The output from the channel including the filter elements 31 and 33 is combined with the output from the channel including the filter elements 32 and 34 to yield the progressive sequence to be applied to the resampler 28 of FIG. 4.

Figure 6:
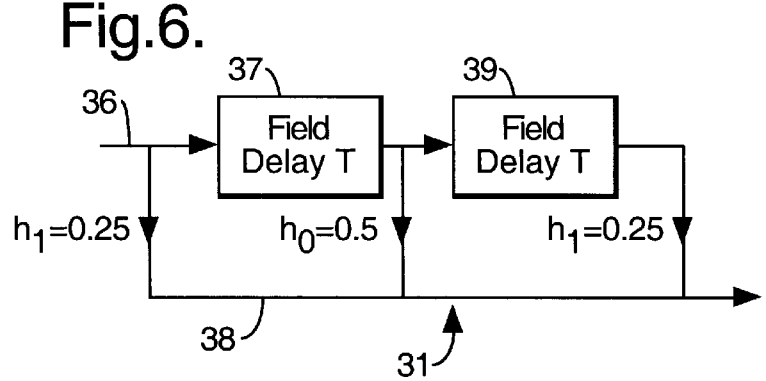
FIGS. 6, 7 and 8 show filter elements used in the filter configuration of FIG. 5.

In FIG. 6, the temporal low-pass filter element 31 is shown in further detail. The filter element includes an input connection 36 which applies the stream of input image samples to a delay element 37 which subjects the image samples to a delay equal to one field interval. The input connection 36 is also connected to pass 0.25 of the value of each input image sample directly to an output line 38. The delay element 37 is connected to supply the delayed image sample values to a second delay element 39 which also subjects the image samples to a delay equal to one field interval. In addition the output from the delay element 37 is connected to pass 0.5 of the value of each image sample to the output line 38. Finally, the delay element 39 is connected to pass 0.25 of the value of each image sample to the output line 38. The coefficients (0.25, 0.5, 0.25) which determine the proportion of each image sample passed to the output line 38 are chosen to characterise the filter of FIG. 6 as a low-pass temporal filter. Low frequency temporal changes pass through the filter so that the original image samples, represented by the filled dots of FIG. 1, pass through substantially unchanged and the zero padded image samples are modified in value towards an average of the temporally adjacent samples.

Figure 6A:
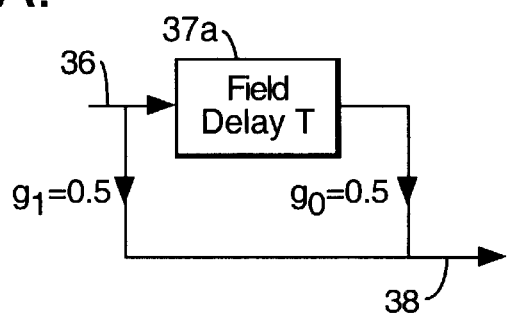
FIGS. 6A and 7A show alternatives to the filter elements of FIGS. 6 and 7 respectively.

FIG. 6A shows an alternative low-pass filter element in which the two delay elements 37 and 39 are replaced by a single delay element 37a which delays the image samples by a delay equal to one field interval. The input connection 36 is connected to pass 0.5 of the value of each input image sample directly to the output line 38 and the delay element is connected to supply 0.5 of the value of each image sample to output line 38.

Figure 7:
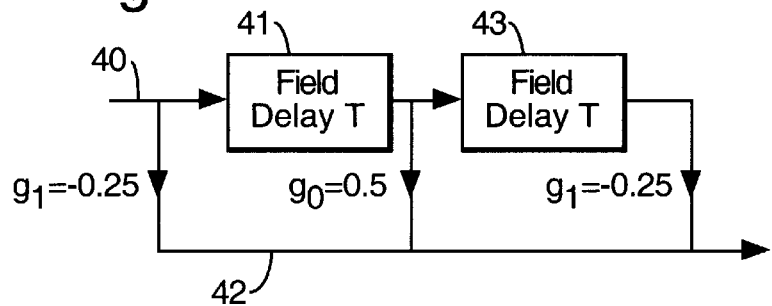

FIG. 7 shows the temporal high-pass filter element 32 which includes an input connection 40, a delay element 41, an output line 42, and a delay element 43. The delay elements 41 and 43 subject the image samples to a delay equal to one field interval. The configuration of the high-pass temporal filter in FIG. 7 is similar to the configuration of the low-pass filter element of FIG. 6. It will be seen from FIG. 7 that the proportions of the image sample values passed to the output line 42 from the input connection 40, the delay element 41 and the delay element 43 are determined by the coefficients −0.25, 0.5 and −0.25 respectively. These coefficients characterise the filter as a high-pass temporal filter.

Figure 7A:
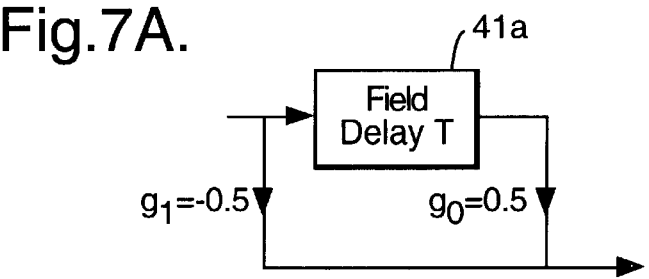

FIG. 7A shows an alternative high pass filter in which the two delay elements 41 and 43 of FIG. 7 are replaced by a single delay element 41a which delays the image samples by a delay equal to one field interval. The filter of FIG. 7A has the coefficients of −0.5 and 0.5 as shown.

Figure 8:
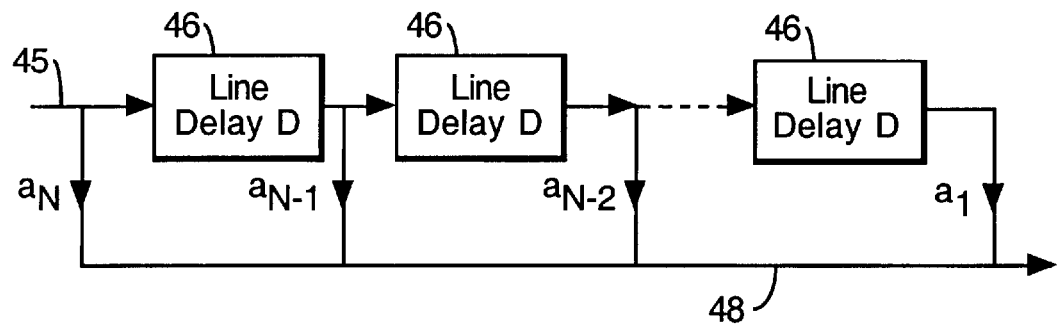

In FIG. 8, the configuration of the vertical low-pass filter elements 33 and 34 is shown in further detail. The filter element includes an input connection 45 connected to supply image sample values to a series of delay elements 46. The number of the delay elements 46 may be varied to alter the frequency response. An output line 48 is connected to receive a proportion of the value of each input sample from the input connection 45 and each of the delay elements 46. The proportions of the values of the image samples received by the output line 48 are determined by coefficients $a_N$, $a_{N-1}$, . . . $a_1$ where N represents the number of the delay elements 46. These coefficients are chosen to define the filter as a low-pass vertical filter. The coefficients selected for the filter element 33 in FIG. 5 differ from the coefficients selected for the filter element 34 in FIG. 5 so as to increase the degree of filtering in the channel including the filter 34 as compared to the degree of vertical filtering in the channel including the filter 33.

Figure 9:
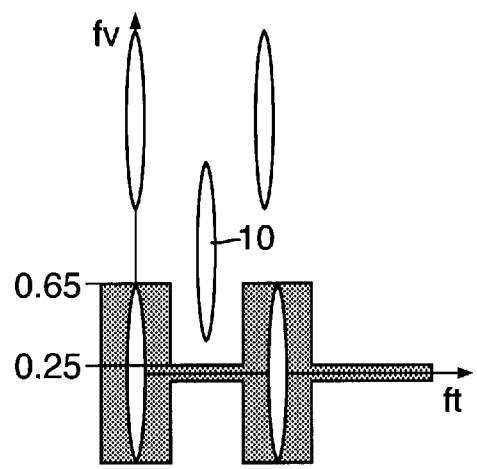
FIGS. 9 and 10 show the frequency responses of the filter configuration of FIG. 5.

FIG. 9 shows the frequency response of the post-filter 27 of FIG. 4. The pass band of the filter is shown as a shaded area overlying the spectra already described with reference to FIG. 2. The shaded area has a temporal high-pass band adjoining a temporal low-pass band. It will be seen that the high-pass temporal band is filtered to a greater degree in the vertical direction than the low-pass temporal band so that the pass band has a step-shape as depicted in FIG. 9. The positioning of the stepped pass band in relation to the spectra 10 is effective to exclude the spectra 10. The overall gain of the filter 27 is 2 within the passband and 0 within the spectral region to be excluded.

Figure 10:
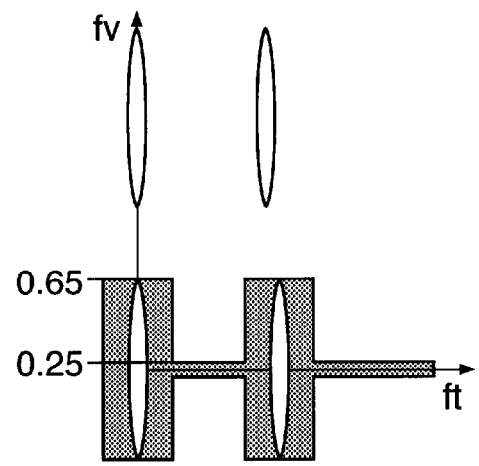

The pre-filter 22 has a pass-band which is similar to that of the post-filter 27 and is shown in FIG. 10. In the case of the pre-filter 22, however, the overall gain is approximately 1.0 for use with the progressive lattice input from the resampler 21.

The pre-filter 22 and the post-filter 27 are of substantially the same configuration as has been described. In either case, the number of temporal sub-bands into which the input stream of image samples is divided is two. The reason is to provide the step in the frequency response as shown in FIGS. 9 and 10. The number of temporal sub-bands may be increased beyond two in either of the filters 22 and 27 by increasing the number of channels in the filter through which the image samples pass. If the temporal sub-bands number three for example, the frequency response would include a double step which again would be designed to exclude the unwanted spectral components 10 already referred to.

The pre-filter 22 and the post-filter 27 have each been shown and described as non-adaptive filters. Either of these filters may however be constructed as an adaptive filter as will now be described with reference to FIGS. 11 to 14. In FIG. 11, the input terminal 30 and the filter elements 31 to 34 are shown in the same configuration as in FIG. 5. The input terminal 30 is additionally connected to a vertical low-pass filter element 50 and a gain control 51. The output from the filter elements 33, 34 and 50 are combined in a ratio of k/k−1 where k is a gain control quantity which is generated by means of the gain control 51. The filter response of the low-pass vertical filter 50 is shown in FIG. 14 in relation to an input video signal in which the image samples conform to an interlace scanning lattice.

The filter coefficients applicable to the filter configuration of FIG. 11 are shown in FIG. 11A. The low pass coefficients in the top line of FIG. 11A are applicable to the low pass filter 31, the high pass coefficients in the middle line of FIG. 11A are applicable to the high pass filter 32 and the all pass coefficients in the bottom line of FIG. 11A are applicable to the vertical filter 50.

Referring to FIG. 12, the gain control element 51 includes a serial connection of a horizontal low-pass filter element 52, a vertical low-pass filter element 53, and a temporal band-pass filter element 54 to produce a filtered signal. The filtered signal is passed through an absolute determination module 55 which provides a signal representing the absolute magnitude of the signal. A field delay element 56 receives the absolute value of the signal and applies a delay equal to one field interval. The delayed signal from the delay element 56 is applied to one input of a comparator 57. Another input to the comparator 57 is provided by the output from the module 55. The comparator 57 is effective to determine the maximum of the two supplied inputs. The maximum value is applied to a mapping circuit 58 which maps the values from the comparator 57 onto the required values k from which the gain control circuit.

Figure 13:
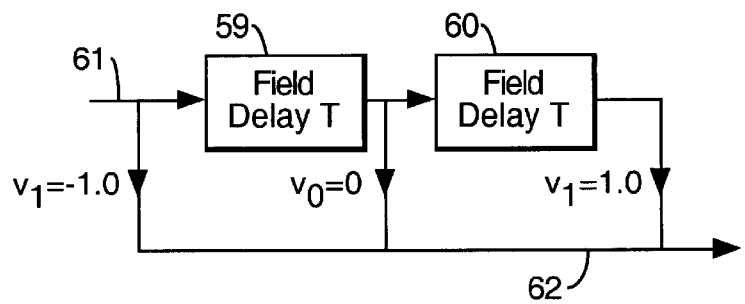
Figure 14:
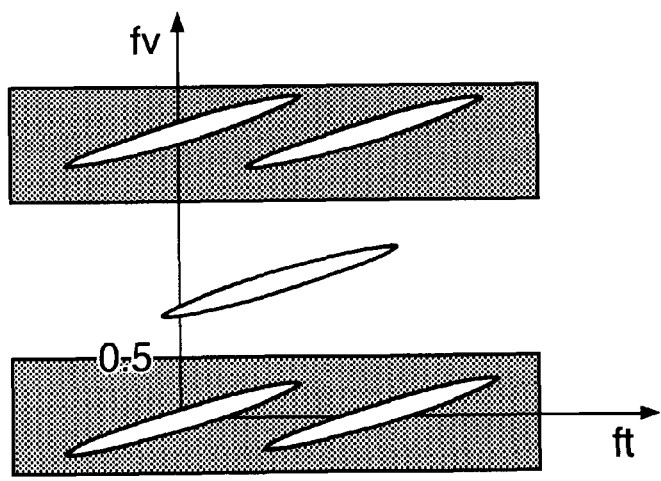
FIG. 14 shows the filter response of a vertical low pass filter included in the filter configuration of FIG. 11; and, FIG. 15 shows the overall frequency response of the transmission system of FIG. 4.

The temporal band-pass filter element 54 is shown in FIG. 13 and includes two serially connected delay elements 59 and 60 between an input terminal 61 and an output line 62. The coefficients of the values of the image samples passed between the input terminal 61 and the output line 62 are seen to be −1.0, 0 and 1.0.

In operation, those spectral components associated with motion pass through the filter elements 52, 53 and 54 of the gain control circuit. The absolute values associated with each field of the incoming signal are compared with the next preceding values so as to derive a measure of the magnitude of the motion and thereby to derive the quantity k. In the complete absence of motion in the scene being depicted by the incoming video signal samples, the value of k derived by the mapping circuit is increased so as to provide for an increased proportion of the filter throughput to come by way of the filter elements 31 to 34. As motion increases, the orientation of the spectrum associated with each line shifts as already described and as seen in FIG. 14. The pass band appropriate to a scene including high motion is that of the vertical low-pass filter element 50. The decrease in the value k controls the gain through the filter element 50 to adapt to the spectral components in the input video signal which are associated with motion in the scene being depicted.

Figure 12A:
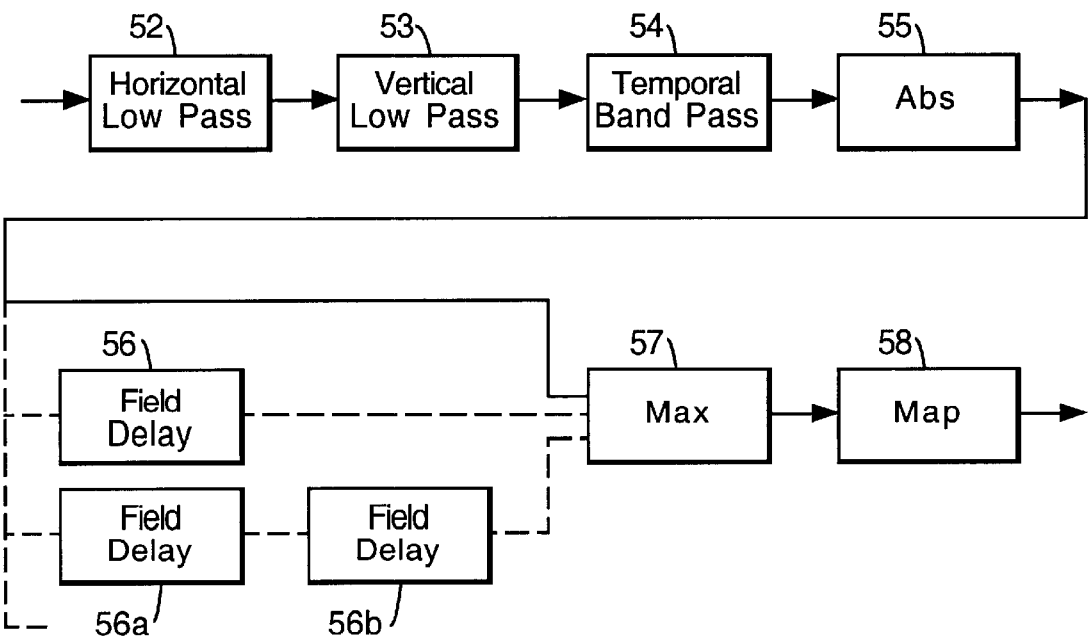
FIG. 12A shows a modification of the gain control circuit of FIG. 12.

The gain control circuit of FIG. 12 may be modified as shown in FIG. 12A. The elements 52 to 55 of FIG. 12 are included in the arrangement shown in FIG. 12A. However, the field delay element 56 is supplemented by one or more optional additional branches, each of which includes field delay elements. A first such branch includes field delay elements 56a and 56b. The second branch, if included, would have three field delay elements. Each successive option branch has one more delay element than the preceding branch and allows the motion to be detected over a successively larger number of fields. As before, the comparator 57 is effective to determine to maximum of all the inputs supplied to it.

The simplicity of the filter structures described make them eminently practical for hardware implementation in contrast to the prior art filters of the non-separable two-dimensional type which are difficult to implement. The algorithms described result in a filter frequency response which does not tile in the frequency domain as would be implied by conventional interpolation algorithms.

Figure 15:
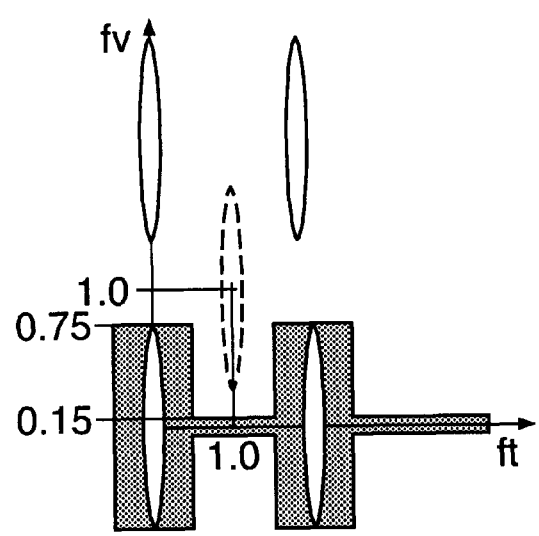

The pre-filter 22 and the post-filter 27 have frequency responses which are matched to provide an overall frequency response as shown in FIG. 15 in which a guard interval separates the unwanted spectral frequencies from the pass band of the matched filters thereby significantly reducing the level of artefacts.

What is claimed is:
1. A method of converting a video signal comprising input image samples conforming to an interlace scanning lattice into a video signal comprising output image samples conforming to a progressive scanning lattice, the method comprising the steps of:
    applying the input image samples to first and second temporal filters to divide the input image samples into first and second temporal sub-bands;
    vertically filtering each temporal sub-band by means of a low-pass vertical filter, the higher temporal sub-band being vertically filtered to a greater degree than the lower temporal sub-band;
    recombining the filtered image samples from each sub-band to form a filter output signal; and,
    re-sampling the filter output signal to form said output image samples.
2. A method as claimed in claim 1, wherein the step of applying the input image samples to first and second temporal filters to divide the input image samples into first and second temporal sub-bands comprises applying the input image samples to first and second temporal filters each of which has an input terminal, an output line and delay elements serially connected between the input terminal and the output line, the method comprising the further step of contributing to the output line of each filter a proportion of each image sample from the input terminal and from each delay element.
3. A method as claimed in claim 2, in which the step of contributing to the output line of the first temporal filter a proportion of each image sample from the input terminal and from each delay element comprises contributing proportions predefined by coefficients in the ratio of 0.25, 0.5 and 0.25.
4. A method as claimed in claim 2 in which the step of contributing to the output line of the second temporal filter a proportion of each image sample from the input terminal and from each delay element comprises contributing proportions predefined by coefficients in the ratio of −0.25, 0.5 and −0.25.

5. A method as claimed in claim 1 wherein the step of vertically filtering each temporal sub-band by means of a low-pass vertical filter comprises applying each temporal sub-band to a vertical filter which has an input terminal, an output line and delay elements serially connected between the input terminal and the output line, the method comprising the further step of contributing to the output line a proportion of each image sample from the input terminal and from each delay element.

6. A method as claimed in claim 1 comprising the further steps of vertically filtering the input image samples to form a vertically filtered signal, combining a proportion k of the vertically filtered signal with a proportion 1−k of said filter output signal, and varying the proportions k and 1−k by means of a gain control circuit responsive to the input image samples.

7. A method of transmitting video information from a transmitter to a receiver, the method comprising the steps of, forming a stream of image samples conforming to a progressive scanning lattice, converting the image samples to conform to an interlace scanning lattice, transmitting the image samples from the transmitter to the receiver, zero-padding the image samples and filtering the zero-padded image samples by means of a method of converting a video signal comprising input image samples conforming to an interlace scanning lattice into a video signal comprising output image samples conforming to a progressive scanning lattice, the method comprising the steps of:

applying the input image samples to first and second temporal filters to divide the input image samples into first and second temporal sub-bands;

vertically filtering each temporal sub-band by means of a low-pass vertical filter, the higher temporal sub-band being vertically filtered to a greater degree than the lower temporal sub-band;

recombining the filtered image samples from each sub-band to form a filter output signal; and re-sampling the filter output signal to form said output image samples.

8. Apparatus for converting a video signal comprising input image samples conforming to an interlace scanning lattice into a video signal comprising output image samples conforming to a progressive scanning lattice, the apparatus comprising:

first and second temporal filters to receive and divide the input image samples into first and second temporal sub-bands;

first and second low-pass vertical filters to vertically filter each temporal sub-band such that the higher temporal sub-band is vertically filtered to a greater degree than the lower temporal sub-band;

recombining means to recombine the filtered image samples from each sub-band to form a filter output signal; and a re-sampler to resample the filter output signal to form said output image samples.

9. Apparatus as claimed in claim 8, wherein the first and second temporal filters each has an input terminal, an output line and delay elements serially connected between the input terminal and the output line, proportioning means being provided to contribute to the output line of each filter a proportion of each image sample from the input terminal and from each delay element.

10. Apparatus as claimed in claim 9, in which the proportioning means contributes to the output line of the first temporal filter a proportion of each image sample from the input terminal and from each delay element in proportions predefined by coefficients in the ratio of 0.25, 0.5 and 0.25.

11. Apparatus as claimed in claim 9, in which the proportioning means contributes to the output line of the second temporal filter a proportion of each image sample from the input terminal and from each delay element in proportions predefined by coefficients in the ratio of −0.25, 0.5 and −0.25.

12. Apparatus as claimed in claim 8, wherein each vertical filter has an input terminal, an output line and delay elements serially connected between the input terminal and the output line, and means to contribute to the output line a proportion of each image sample from the input terminal and from each delay element.

13. Apparatus as claimed in claim 8, comprising a further vertical filter to filter the input image samples to form a vertically filtered signal, means to combine a proportion k of the vertically filtered signal with a proportion of 1−k of said filter output signal, and gain control means for varying the proportions of k and 1−k in response to the input image samples.

14. Apparatus for transmitting video information, the apparatus comprising an image generator for forming a stream of image samples conforming to a progressive scanning lattice, interlacing means for converting the image samples to conform to an interlace scanning lattice, a transmitter for transmitting the image samples to a receiver, zero-padding means for zero-padding the image samples and filtering apparatus for filtering the zero-padded image samples, the filtering apparatus being Apparatus for converting a video signal comprising input image samples conforming to an interlace scanning lattice into a video signal comprising output image samples conforming to a progressive scanning lattice, the apparatus comprising:

first and second temporal filters to receive and divide the input image samples into first and second temporal sub-bands;

first and second low-pass vertical filters to vertically filter each temporal sub-band such that the higher temporal sub-band is vertically filtered to a greater degree than the lower temporal sub-band;

recombining means to recombine the filtered image samples from each sub-band to form a filter output signal; and a re-sampler to resample the filter output signal to form said output image samples.

* * * * *